US009005483B2

(12) United States Patent
Zinn et al.

(10) Patent No.: US 9,005,483 B2

(45) Date of Patent: Apr. 14, 2015

(54) NANOPARTICLE PASTE FORMULATIONS AND METHODS FOR PRODUCTION AND USE THEREOF

(71) Applicant: Lockheed Martin Corporation, Bethesda, MD (US)

(72) Inventors: Alfred A. Zinn, Palo Alto, CA (US); Andrew Fried, Saint Paul, MN (US); Tim Stachowiak, Austin, TX (US); Jerome Chang, San Jose, CA (US); Randall Mark Stoltenberg, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 144 days.

(21) Appl. No.: 13/764,669

(22) Filed: Feb. 11, 2013

(65) Prior Publication Data

US 2013/0209692 A1 Aug. 15, 2013

Related U.S. Application Data

(60) Provisional application No. 61/597,684, filed on Feb. 10, 2012, provisional application No. 61/737,647, filed on Dec. 14, 2012.

(51) Int. Cl.

| | |
|---|---|
| ***H01B 1/22*** | (2006.01) |
| ***C09D 11/00*** | (2014.01) |
| ***H01B 1/02*** | (2006.01) |

(52) U.S. Cl.

CPC .. *H01B 1/02* (2013.01); *H01B 1/22* (2013.01); *Y10S 977/775* (2013.01); *Y10S 977/777* (2013.01); *Y10S 977/783* (2013.01)

(58) Field of Classification Search

CPC ........ C09D 11/52; C09D 11/30; C09D 11/00; C09D 5/24; H01B 1/20; H01B 1/02; H01B 1/16

USPC .................. 252/512–515; 977/775, 777, 783; 427/466, 541

See application file for complete search history.

(56) References Cited

U.S. PATENT DOCUMENTS

| | | | |
|---|---|---|---|
| 3,332,916 | A | 7/1967 | Hay |
| 3,637,508 | A | 1/1972 | Willsey et al. |
| 3,816,491 | A | 6/1974 | Soehring |
| 5,147,841 | A | 9/1992 | Wilcoxon |
| 5,159,171 | A | 10/1992 | Cook et al. |
| 5,358,546 | A | 10/1994 | Rieke |
| 6,143,356 | A | 11/2000 | Jablonski |
| 6,346,189 | B1 | 2/2002 | Dai et al. |
| 6,645,444 | B2 | 11/2003 | Goldstein |
| 6,660,058 | B1 | 12/2003 | Oh et al. |
| 6,783,569 | B2 | 8/2004 | Cheon et al. |
| 7,306,823 | B2 | 12/2007 | Sager et al. |
| 7,419,887 | B1 | 9/2008 | Quick et al. |
| 7,442,879 | B2 | 10/2008 | Das et al. |
| 7,524,351 | B2 | 4/2009 | Hua et al. |
| 7,559,970 | B2 | 7/2009 | Kim et al. |
| 7,628,840 | B2 | 12/2009 | Atsuki et al. |
| 7,637,982 | B2 | 12/2009 | Hou et al. |
| 7,736,414 | B1 | 6/2010 | Zinn |
| 7,780,758 | B2 | 8/2010 | Park et al. |
| 7,847,397 | B2 | 12/2010 | Wu et al. |
| 7,850,933 | B2 | 12/2010 | Yang et al. |
| 7,858,025 | B2 | 12/2010 | Shim et al. |
| 2004/0087441 | A1 | 5/2004 | Bock et al. |
| 2004/0253174 | A1 | 12/2004 | Williams |
| 2005/0129580 | A1 | 6/2005 | Swinehart et al. |
| 2005/0249967 | A1 | 11/2005 | Egli |
| 2006/0046447 | A1 | 3/2006 | Yamamoto |
| 2006/0083694 | A1 | 4/2006 | Kodas et al. |
| 2007/0031722 | A1 | 2/2007 | Adzic et al. |

(Continued)

FOREIGN PATENT DOCUMENTS

| | | | |
|---|---|---|---|
| EP | 1921176 | A2 | 5/2008 |
| JP | 2009006337 | A | 1/2009 |

(Continued)

OTHER PUBLICATIONS

Aslam, et al., "Formulatin of Cu and Cu2O Nanoparticles by Variation of the Surface Ligand: Preparation, Structure and Insulating-to-Metallic Transition," Journal of Colloid and Interface Science 2002, pp. 79-90.

Balan, et al., "A new organometallic synthesis of size-controlled tin(0) nanoparticles," Nanotechnology vol. 16, pp. 1153-1158 (May 17, 2005).

Balan, et al., "Novel low-temperature synthesis of tin(0) nanoparticles," Materials Letters 59, pp. 1080-1084 (2005).

Chu, et al., "Thermal Aqueous Solution Approach for the Synthesis of Triangular and Hexagonal Gold nanoplates with Three Different Size Ranges," Inorganic Chemistry 2006, pp. 808-813, vol. 45.

Ding et al., "Nucleation and Growth of Single-Walled Carbon Nanotubes: A Molecular Dynamics Study", J. Phys. Chem. B, (2004), pp. 17369-17377, vol. 108, American Chemical Society.

(Continued)

*Primary Examiner* — Mark Kopec

*Assistant Examiner* — Haidung Nguyen

(74) *Attorney, Agent, or Firm* — McDermott Will & Emery LLP

(57) ABSTRACT

Nanoparticle paste formulations can be configured to maintain a fluid state, promote dispensation, and mitigate crack formation during nanoparticle fusion. Such nanoparticle paste formulations can contain an organic matrix and a plurality of metal nanoparticles dispersed in the organic matrix, where the plurality of metal nanoparticles constitute about 30% to about 90% of the nanoparticle paste formulation by weight. The nanoparticle paste formulations can maintain a fluid state and be dispensable through a micron-size aperture. The organic matrix can contain one or more organic solvents, such as the combination of one or more hydrocarbons, one or more alcohols, one or more amines, and one or more organic acids. Optionally, the nanoparticle paste formulations can contain about 0.01 to about 15 percent by weight micron-scale metal particles or other additives.

22 Claims, 4 Drawing Sheets

(56) References Cited

U.S. PATENT DOCUMENTS

| | | | | |
|---|---|---|---|---|
| 2007/0202304 | A1 | 8/2007 | Golovko et al. | |
| 2007/0269991 | A1 | 11/2007 | Jang et al. | |
| 2007/0290175 | A1 | 12/2007 | Kim | |
| 2007/0298536 | A1 | 12/2007 | Ren et al. | |
| 2008/0003364 | A1 | 1/2008 | Ginley et al. | |
| 2008/0011125 | A1 | 1/2008 | Shirata et al. | |
| 2008/0032132 | A1 | 2/2008 | Woodfield et al. | |
| 2008/0044657 | A1 | 2/2008 | Woo et al. | |
| 2008/0072706 | A1 | 3/2008 | Lee et al. | |
| 2008/0124268 | A1 | 5/2008 | Yang et al. | |
| 2008/0149176 | A1 | 6/2008 | Sager et al. | |
| 2008/0151515 | A1 | 6/2008 | Das et al. | |
| 2008/0159902 | A1 | 7/2008 | Shim et al. | |
| 2008/0230750 | A1 | 9/2008 | Gillies et al. | |
| 2008/0278181 | A1 | 11/2008 | Zhong et al. | |
| 2009/0029148 | A1 | 1/2009 | Hashimoto et al. | |
| 2009/0145765 | A1 | 6/2009 | Abys et al. | |
| 2009/0214764 | A1 | 8/2009 | Li et al. | |
| 2009/0239073 | A1 | 9/2009 | Huang et al. | |
| 2009/0285976 | A1 | 11/2009 | Lochtman et al. | |
| 2009/0301606 | A1 | 12/2009 | Ueshima | |
| 2010/0065616 | A1* | 3/2010 | Zinn | 228/249 |
| 2010/0075137 | A1 | 3/2010 | Sinton et al. | |
| 2010/0139455 | A1 | 6/2010 | Tilley et al. | |
| 2010/0275729 | A1 | 11/2010 | Jun et al. | |
| 2010/0314578 | A1 | 12/2010 | Purdy | |
| 2011/0260115 | A1* | 10/2011 | Kim et al. | 252/503 |

FOREIGN PATENT DOCUMENTS

| | | | |
|---|---|---|---|
| KR | 20080010691 | A | 1/2008 |
| WO | WO-2005/065100 | A2 | 7/2005 |
| WO | WO-2006/063134 | A2 | 6/2006 |
| WO | WO-2008023944 | | 2/2008 |
| WO | WO-2009/085342 | | 7/2009 |
| WO | WO-2009/115643 | A2 | 9/2009 |
| WO | WO-2010/036114 | A2 | 4/2010 |

OTHER PUBLICATIONS

Foresti, et al., "New Thiophene Monolayer Protected Copper Nanoparticles: Synthesis and Chemical-Physical Characterization", Department of Chemistry "G. Ciamician" Alma Mater Studiorum Bologna University.

Gupta, Synthesis of Metallic Nanoparticles and Their Applications, Department of Research and Advanced Studies of the University of Cincinnati 2006.

Hsu, et al., "Nanostructures of Sn and Their Enhanced, Shape-Dependent Superconducting Properties," SmakII 2006, pp. 268-273, vol. 2, No. 2.

Jiang, et al., "Size-Dependent Melting Properties of Tin Nanoparticles", Chemical Physics Letters, 2006, pp. 492-496, vol. 429, Science Direct.

Kang, et al., "Inkjet Printed Electronics Using Copper Nanoparticle Ink," J Mater Sci: Mater Electron 2010, vol. 21, pp. 1213-1220.

Kanninen, et al., "Influence of Ligand Structure on the Stability and Oxidation of Copper Nanoparticles", Journal of Colloid and Interface Science 318 (2008) pp. 88-95.

Kogiso, et al., "One-Dimensional Organization of Copper Nanoparticles by Chemical Reduction of Lipid-Copper Hybrid Nanofibers", The Royal Society of Chemistry 2002, pp. 2492-2493.

Kwon, et al., "Effect of Capping Agents in Tin Nanoparticles on Electrochemical Cycling," Electrochemical nad Solid-State Letters 2006, pp. A34-SA38, vol. 9, No. 1.

Lin, et al., "The influence of nano-particles on microstructureal development at the interface of Sn3.5Ag-solder and Cu-substrate," Int J Nanomanufacturing, 2007 vol. 1, No. 3.

Lisiecki, et al., "Control of the Shape and the Size of Copper Metallic Particles", J. Phys. Chem 1996, 100, pp. 4160-4166.

Magdassi, et al., "Copper Nanoparticles for Prined Electronics: Routes Towards Achieving Oxidation Stability," Materials 2010, vol. 3, pp. 4626-4638.

Masala, et al., "Synthesis Routes for Large Volumes of Nanoparticles," Annu Rev Mater Res 2004, pp. 41-81.

Mirjalili, et al. "Prediction of Nanoparticles' Size-Dependent Melting Temperature Using Mean Coordination Number Concept," Journal of Physics and Chemistry of Solids, 2008, pp. 2116-2123, 69.

Mott, et al., "Synthesis of Size-Controlled and Shaped Copper Nanoparticles", Langmuir 2007, 23, pp. 5740-5745.

Murai, et al., "Preparation of copper Nanoparticles With an Organic Coating by a Pulsed Wire Discharge Method", Journal of Ceramic Processing Research, 2007, vol. 8, No. 2, pp. 114-118.

Oncel et al., "Carbon Nanotube Synthesis via the Catalytic CVD Method: A Review on the Effect of Reaction Parameters", Fullerenes, Nanotubes, and Carbon Nanostructures, (2006), pp. 17-37, vol. 14, Taylor & Francis Group, LLC.

Product Description—"Copper Nano Powder" TradeKey 2011.

Product Description—"Copper Nanoparticle and Cupric Salt Product Specialized Team", Suzhou Cantuo Nano Technology Co. Ltd. 2010.

Product Description—"Copper Nanoparticle, Cu", NaBond Technologies Co., Ltd. 2001-2009.

Product Description—"Copper Nanoparticles", American Elements 2001-2010.

Product Description—"Nano-Copper", Sun Innovations, Inc. 2005-2010.

Product Description—"Nanopowders" Sigma-Aldrich 2010.

Product Description—"Powders: Nanoparticles & Nanopowders", SkySpring Nanomaterials, Inc.

Product Description—Copper Nanoparticle (Copper Nanopowder), Suzhou Canfuo Nano Technology Co., Ltd. 1997-2011.

Product Description—Metal & Alloy Nanoparticles, Nanoshel 2007-2009.

Pulkkinen, et al., "Poly(ethylene imine) and Tetraethylenepentamine as Protecting Agents for Metallic Copper Nanoparticles", Applied Materials & Interfaces, (2009) vol. 1, No. 2, pp. 519-525.

Ritschel et al., "Rhenium-Catalyzed Growth Carbon Nanotubes", J. Phys. Chem. C, (2007), pp. 8414-8417, vol. 111, American Chemical Society.

Shandiz, "Effective Coordination Number Model for the Size Dependency of Physical Properties of Nanocrystals," Journal of Physics: Condensed Matter, 2008, pp. 1-9, 20, IOP Publishing.

Wang, et al., "Poly(allylamine)-Stabilized Colloidal Copper Nanoparticles: Synthesis, Morphology and Their Surface-Enhanced Raman Scattering Properties," Langmuir Article 2010, vol. 26, No. 10, pp. 7469-7474.

Wu, et al., "One-Step Green Route to Narrowly Dispersed Copper Nanocrystals", Journal of Nanoparticle Research (2006) pp. 965-969.

Wu, et al., "Simple One-Step Synthesis of Uniform Disperse Copper Nanoparticles", Mater. Res. Soc. Symp, Proc. 2005, vol. 879E, pp. Z6.3.1-Z6.3.6.

Yang, et al., "Synthesis and Characterization of Sn/R, Sn/Si-R, and Sn/SiO.sub.2 Core/Shell Nanoparticles," Chem. Mater, vol. 12, No. 4, pp. 983-988 (2000).

Yeshchenko, et al., "Size-Dependent Melting of Spherical Copper Nanoparticles Embedded in a Silica Matrix", Physical Review B 75 (2007), pp. 085434-1 to 085434-6.

Yonezawa, et al., "The Preparation of Copper Fine Particle Paste and Its Application as the Inner Electrode Material of a Multilayered Ceramic Capacitor", Nanotechnology 19 (2008) 145706, pp. 1-5.

Zhao, et al., "Preparation of tin nanoparticles by solution dispersion," Materials Science and Engineering, vol. A359, pp. 405-407 (May 2003).

* cited by examiner

NANOPARTICLE PASTE FORMULATIONS AND METHODS FOR PRODUCTION AND USE THEREOF

CROSS-REFERENCE TO RELATED APPLICATIONS

This application claims the benefit of priority under 35 U.S.C. §119 from U.S. Provisional Patent Applications 61/597,684, filed Feb. 10, 2012, and 61/737,647, filed Dec. 14, 2012, each of which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to nanoparticles, and, more specifically, to formulations containing nanoparticles.

BACKGROUND

Although lead has traditionally been used in numerous industrial applications, current regulations have mandated the elimination and/or phase out of lead in most commercial products. These mandates have stimulated new product development based upon lead-free technologies.

Soldering applications, particularly in electronics and vehicle manufacturing, have been heavily impacted by the ban on lead. For example, in response to the European Union's RoHS initiative, solder manufacturers have already switched over 75% of their products from traditional tin-lead solders to lead-free formulations. As a result, it has become increasingly difficult to purchase lead-based solders and systems, leading to significantly increased costs and long lead times. Accordingly, their use is frequently reserved for mission-critical applications in the defense, medical, automotive, space, and oil/gas industries.

Numerous alternatives to traditional lead-based solders have been developed (>300), the Sn/Ag/Cu (SAC) system being among the most widely used, but many have exhibited drawbacks that can make them unsuitable for use in certain applications. For example, SAC solder can be unsuitable for extreme environments such as those found in automotive, military, and space vehicles, where long life and reliability are of significant importance. SAC solder has a significantly higher eutectic melting point (m.p. of ~217° C.) than does traditional Sn/Pb solder (m.p. of 183° C. for 63/37 Sn/Pb or 188° C. for 60/40 Sn/Pb), thus limiting its use to substrates that are capable of withstanding its relatively high working temperatures for effective processing (approximately 240° C.-270° C.). The need for high performance, thermally stable substrates for use in conjunction with SAC can significantly impact the cost of consumer products relative to those in which lower quality substrates can be used. In addition, silver is a relatively expensive component of the SAC system, and there is presently insufficient worldwide silver production capacity (22,000 tons/year) to allow total replacement of lead-based solders (90,000 tons/year) to take place with lead-free solder alternatives containing significant quantities of silver. Silver prices have also recently been subject to rapid escalation and volatility, which are undesirable features for a commodity material. Still another limitation of SAC solder is that its high tin content makes it prone to tin whisker formation, which can increase the risk of electrical shorting.

Several compositions containing nanoparticles have also been proposed as replacements for traditional lead-based solders. Nanoparticles can exhibit physical and chemical properties that sometimes differ significantly from those observed in the corresponding bulk material. For example, metal nanoparticles that are about 20 nm or less in size can exhibit a fusion temperature that is significantly below the melting point of the corresponding bulk metal, thereby allowing metal nanoparticles to be at least partially consolidated into bulk objects at temperatures comparable to those of traditional lead-based and lead-free solder materials. Copper nanoparticles, in particular, can have a fusion temperature that is comparable to that of the working temperature of traditional lead-based soldering materials and have been extensively studied as an alternative solder material.

A number of scalable processes for producing bulk quantities of metal nanoparticles in a targeted size range have been developed. Most typically, such processes for producing metal nanoparticles take place by reducing a metal precursor in the presence of a surfactant. Metal nanoparticles can then be isolated and purified from the reaction mixture by common isolation techniques. However, the as-produced metal nanoparticles are often prone to clumping and are difficult to directly use. For precision applications such as screen and ink-jet printing, as-produced metal nanoparticles can sometimes be unsuitable for utilization in these techniques, unless utilized in highly diluted form.

When metal nanoparticles are dispersed in a solvent to improve their workability and dispensation properties, further difficulties can be encountered when consolidating the metal nanoparticles into bulk objects, joints, and coatings. For example, if extreme care is not taken during metal nanoparticle consolidation, cracking and void formation can occur due to volume contraction as the solvent and surfactant are removed from the vicinity of the metal nanoparticles. Such cracking and void formation can detrimentally impact the mechanical strength and electrical conductivity of bulk objects and like materials formed from metal nanoparticles.

Although metal nanoparticles have desirable attributes that can make them amenable for use in many different applications, nanoparticle formulations that adequately promote both dispensation and nanoparticle consolidation have yet to be developed. The present invention satisfies the foregoing need and provides related advantages as well.

SUMMARY

In some embodiments, the present disclosure describes nanoparticle paste formulations containing an organic matrix and a plurality of metal nanoparticles dispersed in the organic matrix, where the plurality of metal nanoparticles forms about 30% to about 90% of the nanoparticle paste formulation by weight. The nanoparticle paste formulation maintains a fluid state and is dispensable through a micron-size aperture.

In some embodiments, the present disclosure describes nanoparticle paste formulations containing an organic matrix and a plurality of metal nanoparticles dispersed in the organic matrix, where the plurality of metal nanoparticles forms about 30% to about 90% of the nanoparticle paste formulation by weight. The organic matrix contains one or more organic solvents, where the one or more organic solvents are a hydrocarbon, an alcohol, an amine, and an organic acid. The metal nanoparticles have a surfactant coating thereon, and the surfactant coating contains one or more surfactants.

In some embodiments, the present disclosure describes methods including providing a plurality of metal nanoparticles having a surfactant coating thereon, and combining the plurality of metal nanoparticles with an organic matrix to form a nanoparticle paste formulation. The plurality of metal nanoparticles forms about 30% to about 90% of the nanoparticle paste formulation by weight. The organic matrix contains one or more organic solvents, where the one or more organic solvents are a hydrocarbon, an alcohol, an amine, and an organic acid.

In some embodiments, the present disclosure describes methods including providing a nanoparticle paste formulation containing an organic matrix and a plurality of metal nanoparticles dispersed in the organic matrix, dispensing the nanoparticle paste formulation onto a surface, and at least partially consolidating the metal nanoparticles with one another by heating the dispensed nanoparticle paste formulation at a temperature at or above a fusion temperature of the metal nanoparticles. The plurality of metal nanoparticles forms about 30% to about 90% of the nanoparticle paste formulation by weight. The organic matrix contains one or more organic solvents, where the one or more organic solvents are a hydrocarbon, an alcohol, an amine, and an organic acid.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
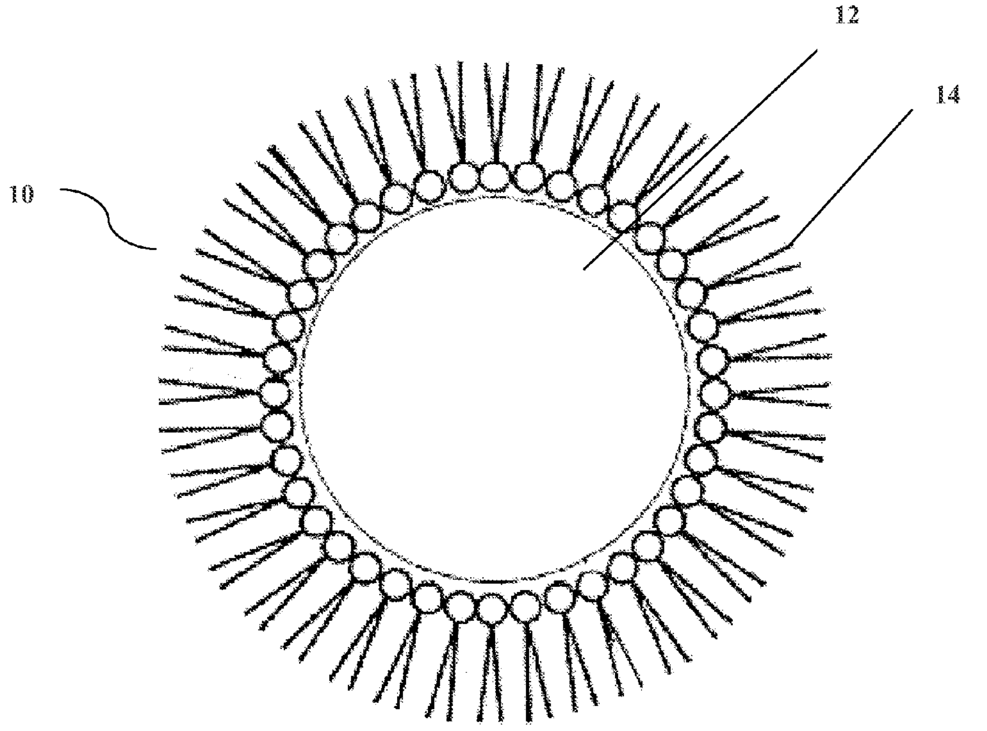
FIGS. 1 and 2 show presumed structures of metal nanoparticles having a surfactant coating thereon.

The present disclosure is directed, in part, to dispensable nanoparticle paste formulations. The present disclosure is also directed, in part, to methods for making such nanoparticle paste formulations. In addition, the present disclosure is directed, in part, to methods for consolidating such nanoparticle paste formulations.

Metal nanoparticles can exhibit a number of properties that differ significantly from those of the corresponding bulk metal. One property of metal nanoparticles that can be of particular importance is nanoparticle fusion or consolidation that occurs at the metal nanoparticles' fusion temperature. As used herein, the term "fusion temperature" will refer to the temperature at which a metal nanoparticle liquefies, thereby giving the appearance of melting. As used herein, the terms "fusion" or "consolidation" will refer to the coalescence or partial coalescence of metal nanoparticles with one another to form a larger mass. Upon decreasing in size, particularly below about 20 nm in equivalent spherical diameter, the temperature at which metal nanoparticles can be liquefied drops dramatically from that of the corresponding bulk metal. For example, copper nanoparticles having a size of about 20 nm or less can have fusion temperatures of about 220° C. or below, or about 200° C. or below, in comparison to bulk copper's melting point of 1083° C. Thus, the fusion of metal nanoparticles can allow bulk metal objects to be fabricated at significantly lower processing temperatures than the melting point of the corresponding bulk metal. Moreover, the lower processing temperatures can advantageously allow metal nanoparticles to be used in combination with lower quality substrates that are not particularly thermally resistant.

As described above, as-produced metal nanoparticles can be difficult to handle and dispense through small apertures, particularly micron-size apertures used in precision deposition techniques. These difficulties can make it problematic to accurately place the nanoparticles during applications such as, for example, screen and ink jet printing. Moreover, as discussed in more detail below, crack formation can occur during metal nanoparticle consolidation unless extreme care is taken while fusing the metal nanoparticles together. In some embodiments, metal nanoparticles can include a surfactant coating thereon. Suitable procedures for synthesizing metal nanoparticles having a surfactant coating are described in more detail hereinbelow. Despite the desirability for synthesizing metal nanoparticles having a surfactant coating, loss of the surfactants during metal nanoparticle consolidation can aggregate the aforementioned cracking and void formation issues.

In contrast to the properties of as-produced metal nanoparticles and even certain solvent dispersions of metal nanoparticles, the present inventors discovered that highly workable and dispensable nanoparticle paste formulations can be prepared by dispersing as-produced metal nanoparticles in an organic matrix containing one or more organic solvents. As used herein, the term "nanoparticle paste formulation" will refer to a viscous fluid containing metal nanoparticles dispersed therein. Use of the term "paste" does not necessarily imply an adhesive function. Through judicious choice of the organic solvent(s), the dispensation of the nanoparticle paste formulations can be promoted. Moreover, by tailoring the composition of the organic matrix and the loading of metal nanoparticles therein, the nanoparticle paste formulations can be made to be less prone to cracking and void formation during metal nanoparticle consolidation than when as-produced or simple metal nanoparticle solvent dispersions are employed.

One way in which the present nanoparticle paste formulations can promote a decreased degree of cracking and void formation during metal nanoparticle consolidation is by maintaining a high solids content. More particularly, in some embodiments, the present nanoparticle paste formulations can contain at least about 30% metal nanoparticles by weight, particularly about 30%) to about 90% metal nanoparticles by weight of the metal nanoparticle paste formulation, or about 50% to about 90% metal nanoparticles by weight of the metal nanoparticle paste formulation, or about 70% to about 90% metal nanoparticles by weight of the metal nanoparticle paste formulation. Moreover, in some embodiments, small amounts (e.g., about 0.01% to about 15% by weight of the nanoparticle paste formulation) of micron-scale metal particles can be present in addition to the metal nanoparticles. Although such micron-scale metal particles need not necessarily be present, the present inventors have found them to desirably promote the fusion of metal nanoparticles into a consolidated mass and further reduce the incidence of cracking. Instead of being liquefied and undergoing fusion, the micron-scale metal particles can simply become joined together when contacted with liquefied metal nanoparticles that have been raised above their fusion temperature.

Decreased cracking and void formation during metal nanoparticle consolidation can also be promoted by judicious choice of the solvent(s) forming the organic matrix of the nanoparticle paste formulations. In this regard, the present inventors surprisingly discovered that a tailored combination of organic solvents can promote consolidation of the metal nanoparticles with a decreased incidence of cracking and void formation. More particularly, the present inventors discovered that an organic matrix containing one or more hydrocarbons, one or more alcohols, one or more amines, and one or more organic acids can be especially effective for this purpose. Without being bound by any theory or mechanism, it is believed that this combination of organic solvents can facilitate the removal and sequestration of surfactant molecules surrounding the metal nanoparticles, such that the metal nanoparticles can more easily fuse together with one another. More particularly, it is believed that hydrocarbon and alcohol solvents can passively solubilize surfactant molecules released from the metal nanoparticles by Brownian motion and reduce their ability to become re-attached thereto. In concert with the passive solubilization of surfactant molecules, amine and organic acid solvents can actively sequester the surfactant molecules through a chemical interaction such that they are no longer available for recombination with the metal nanoparticles.

Further tailoring of the solvent composition can be performed to reduce the suddenness of volume contraction that takes place during surfactant removal and metal nanoparticle consolidation. Specifically, more than one member of each class of organic solvent (i.e., hydrocarbons, alcohols, amines, and organic acids), can be present in the organic matrix, where the members of each class have boiling points that are separated from one another by a set degree. For example, in some embodiments, the various members of each class can have boiling points that are separated from one another by about 20° C. to about 50° C. By using such a solvent mixture, sudden volume changes due to rapid loss of solvent can be minimized during metal nanoparticle consolidation, since the various components of the solvent mixture can be removed gradually over abroad range of boiling points (e.g., about 50° C. to about 200° C.).

In addition to tailoring the composition of the nanoparticle paste formulations, the present inventors discovered that the heating profile used to promote thermal consolidation of the metal nanoparticles can influence the degree of cracking and void formation. In general, the present inventors found that slow heating of the nanoparticle paste formulations up to the fusion temperature of the metal nanoparticles desirably reduced the degree of cracking and void formation. Moreover, the present inventors found that holding the temperature at one or more temperature plateaus below the fusion temperature could desirably reduce the incidence of cracking and void formation by slowly removing the most volatile components of the nanoparticle paste formulations before the occurrence of metal nanoparticle fusion. Again without being bound by any theory or mechanism, it is believed that slow heating and/or thermal plateaus can desirably decrease the volume contraction that occurs during surfactant and solvent removal, thereby decreasing the incidence of cracking and void formation during metal nanoparticle consolidation.

As used herein, the term "metal nanoparticle" will refer to metal particles that are about 100 nm or less in size, without particular reference to the shape of the metal particles.

As used herein, the term "organic matrix" will refer to a continuous fluid phase containing one or more organic compounds and having the ability to flow, with or without the application of a force thereto.

As used herein, the term "micron-size aperture" will refer to an opening that is between about 1 micron and about 200 microns in size. Micron-size apertures can include, but are not limited to, needles, tubes, print heads, atomizers, nebulizers, and the like. In some embodiments, micron-size apertures can range between about 1 micron and about 200 microns in size, or between about 1 micron and about 100 microns in size, or between about 1 micron and about 75 microns in size, or between about 1 micron and about 50 microns in size, or between about 1 micron and about 25 microns in size, or between about 1 microns and about 10 microns in size, or between about 5 microns and about 250 microns in size, or between about 5 microns and about 100 microns in size, or between about 5 microns and about 50 microns in size, or between about 5 microns and about 25 microns in size.

As used herein, the term "micron-scale metal particles" will refer to metal particles that are about 100 nm or greater in size in at least one dimension.

As used herein, the term "substrate" will refer to a surface upon which a nanoparticle paste formulation is dispensed and consolidated.

The terms "consolidate," "consolidation" and other variants thereof will be used interchangeably herein with the terms "fuse," "fusion" and other variants thereof.

As used herein, the terms "partially fused," "partial fusion," and other derivatives and grammatical equivalents thereof will refer to the partial coalescence of metal nanoparticles with one another. Whereas totally fused metal nanoparticles retain essentially none of the structural morphology of the original unfused metal nanoparticles (i.e., they resemble bulk metal), partially fused metal nanoparticles retain at least some of the structural morphology of the original unfused metal nanoparticles. The properties of partially fused metal nanoparticles can be intermediate between those of the corresponding bulk metal and the original unfused metal nanoparticles.

In some embodiments, nanoparticle paste formulations described herein can contain an organic matrix and a plurality of metal nanoparticles dispersed in the organic matrix, where the nanoparticle paste formulation contains about 30% to about 90% metal nanoparticles by weight. The nanoparticle paste formulations maintain a fluid state and are dispensable through a micron-size aperture. In more particular embodiments, the nanoparticle paste formulations can contain about 50% to about 90% metal nanoparticles by weight, or about 70% to about 90% metal nanoparticles by weight.

By maintaining a fluid state and ready dispensability, the nanoparticle paste formulations can be used in a variety of applications including electronics manufacturing, soldering, thermal conduction, and the like. The nanoparticle paste formulations can be applied to a substrate mechanically in such applications, including via techniques such as screen printing, stencil printing, ink jet printing and the like, or manually by a user, including via techniques such as syringe deposition, spraying, spreading, painting, and the like.

In some embodiments, the nanoparticle paste formulations can be formulated to have a desired viscosity in order to be compatible with a given application. Given the benefit of this disclosure, one of ordinary skill in the art will be able to prepare a nanoparticle paste formulation having a desired viscosity. In various embodiments, the nanoparticle paste formulations can have a viscosity ranging between about 1000 cP and about 250,000 cP, or between about 5,000 cP and about 200,000 cP, or between about 25,000 cP and about 250,000 cP, or between about 50,000 cP and about 250,000 cP, or between about 100,000 cP and about 250,000 cP, or between about 150,000 cP and about 250,000 cP, or between about 100,000 cP and about 200,000 cP, or between about 100,000 cP and about 200,000 cP, or between about 100,000 cP and about 150,000 cP, or between about 150,000 cP and about 200,000 cP. The viscosity of the nanoparticle paste formulations can be modulated by numerous factors including, for example, choice of the various organic solvents in the organic matrix, the quantity of metal nanoparticles and other solids in the organic matrix, the size of the metal nanoparticles and the overall particle size within the nanoparticle paste formulations, and the addition of various thickening and rheology control agents to the nanoparticle paste formulations.

In order to promote dispensability through micron-size apertures, the nanoparticle paste formulations can desirably have a low maximum particle size. As discussed in further detail below, in some embodiments, the nanoparticle paste formulations can be homogenized to break apart aggregates of metal nanoparticles in order for a low maximum particle size to be realized. Size-based separation techniques can also be employed in some embodiments. In some embodiments, the nanoparticle paste formulations can have a maximum particle size of about 75 microns or less. In other embodiments, the nanoparticle paste formulations can have a maximum particle size of about 50 microns or less, or about 40 microns or less, or about 30 microns or less, or about 20 microns or less, or about 10 microns or less. The maximum particle size may include agglomerates of metal nanoparticles with themselves and with other components of the nanoparticle paste formulations.

In various embodiments, at least a portion of the metal nanoparticles used in the nanoparticle paste formulations can be about 20 nm or less in size. As discussed above, metal nanoparticles in this size range have fusion temperatures that are significantly lower than those of the corresponding bulk metal and readily undergo consolidation with one another as a result. In some embodiments, metal nanoparticles that are about 20 nm or less in size can have a fusion temperature of about 220° C. or below (e.g., a fusion temperature in the range of about 150° C. to about 220° C.) or about 200° C. or below, which can provide advantages that are noted above. In some embodiments, at least a portion of the metal nanoparticles can be about 10 nm or less in size, or about 5 nm or less in size. In some embodiments, at least a portion of the metal nanoparticles can range between about 1 nm in size to about 20 nm in size, or between about 1 nm in size and about 10 nm in size, or between about 1 nm in size to about 5 nm in size, or between about 3 nm in size to about 7 nm in size, or between about 5 nm in size to about 20 nm in size. In some embodiments, substantially all of the metal nanoparticles can reside within these size ranges. In some embodiments, larger metal nanoparticles can be combined in the nanoparticle paste formulations with metal nanoparticles that are about 20 nm in size or less. For example, in some embodiments, metal nanoparticles ranging from about 1 nm to about 10 nm in size can be combined with metal nanoparticles that range from about 25 nm to about 50 nm in size, or with metal nanoparticles that range from about 25 nm to about 100 nm in size. As further discussed below, micron-scale metal particles or nanoscale particles can also be included in the nanoparticle paste formulations in some embodiments. Although larger metal nanoparticles and micron-scale metal particles may not be liquefiable at low temperatures, they can still become consolidated upon contacting the liquefied smaller metal nanoparticles at or above their fusion temperature, as generally discussed above.

In some embodiments, the metal nanoparticles can have a surfactant coating thereon, where the surfactant coating contains one or more surfactants. The surfactant coating can be formed on the metal nanoparticles during their synthesis. Formation of a surfactant coating on metal nanoparticles during their synthesis can desirably limit the ability of the metal nanoparticles to fuse to one another, limit agglomeration of the metal nanoparticles, and promote the formation of a population of metal nanoparticles having a narrow size distribution. Further details regarding the synthesis of metal nanoparticles and suitable surfactants are discussed in more detail below.

The types of metal nanoparticles that can be used in the present nanoparticle paste formulations are not believed to be particularly limited. Suitable metal nanoparticles can include, but are not limited to, tin nanoparticles, copper nanoparticles, aluminum nanoparticles, palladium nanoparticles, silver nanoparticles, iron nanoparticles, cobalt nanoparticles, nickel nanoparticles, titanium nanoparticles, zirconium nanoparticles, hafnium nanoparticles, tantalum nanoparticles, and the like. For soldering and electronics applications, copper is a particularly desirable metal due to its low cost, strength, and excellent electrical and thermal conductivity values.

Any suitable technique can be employed for forming the metal nanoparticles used in the embodiments described herein. Particularly facile metal nanoparticle fabrication techniques are described in commonly owned U.S. Pat. Nos. 7,736,414, 8,105,414, and 8,192,866 and commonly owned U.S. patent application Ser. Nos. 13/656,590, filed Oct. 19, 2012; 13/228,411, filed Sep. 8, 2011; 13/040,207, filed Mar. 3, 2011; and 12/813,463, filed Jun. 10, 2010, each of which is incorporated herein by reference in its entirety. As described therein, metal nanoparticles can be fabricated in a narrow size range by reduction of a metal salt in a solvent in the presence of a suitable surfactant system, which can include one or more different surfactants. Further description of suitable surfactant systems follows below. Without being bound by any theory or mechanism, it is believed that the surfactant system can mediate the nucleation and growth of the metal nanoparticles, limit surface oxidation of the metal nanoparticles, and/or inhibit metal nanoparticles from extensively aggregating with one another prior to being at least partially fused together. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, and glyme, diglyme, triglyme, and tetraglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides).

Figure 2:
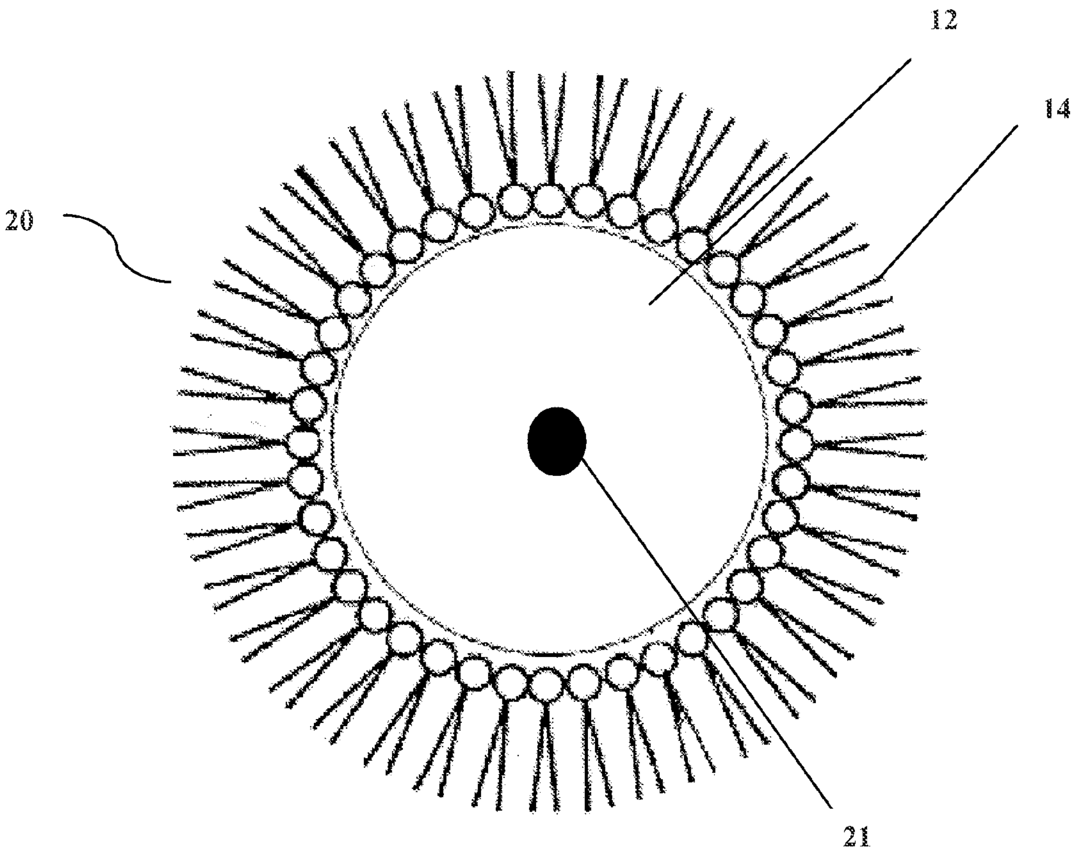

FIGS. 1 and 2 show presumed structures of metal nanoparticles suitable for use in the present nanoparticle paste formulations. As shown in FIG. 1, metal nanoparticle 10 includes metallic core 12 and surfactant layer 14 overcoating metallic core 12. Surfactant layer 14 can contain any combination of surfactants, as described in more detail below. Metal nanoparticle 20 shown in FIG. 2 is similar to that depicted in FIG. 1, but metallic core 12 is grown about nucleus 21, which can be a metal that is the same as or different than that of metallic core 12. Because nucleus 21 is buried deep within metallic core 12 in metal nanoparticle 20, it is not believed to significantly affect the overall nanoparticle properties. In some embodiments, the copper nanoparticles can have an amorphous morphology.

In various embodiments, the surfactant system used to prepare the metal nanoparticles can include one or more surfactants. The differing properties of various surfactants can be used to tailor the properties of the metal nanoparticles. Factors that can be taken into account when selecting a surfactant or combination of surfactants for use in synthesizing metal nanoparticles can include, for example, ease of surfactant dissipation from the metal nanoparticles during nanoparticle fusion, nucleation and growth rates of the metal nanoparticles, the metal component of the metal nanoparticles, and the like.

In some embodiments, an amine surfactant or combination of amine surfactants, particularly aliphatic amines, can be used during the synthesis of metal nanoparticles. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure versus having ready volatility and/or ease of handling. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle fusion.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different, $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for use in forming metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with forming metal nanoparticles can be envisioned by one having ordinary skill in the art.

Suitable pyridines can include both pyridine and its derivatives. Illustrative pyridines that can be suitable for use in forming metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with forming metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be used in forming metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with forming metal nanoparticles can be envisioned by one having ordinary skill in the art.

Suitable thiols can have a formula of RSH, where R is an alkyl or aryl group having from about 4 to about 16 carbon atoms. Illustrative thiols that can be used for forming metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with forming metal nanoparticles can be envisioned by one having ordinary skill in the art.

In some embodiments, the organic matrix can contain one or more organic solvents. In some embodiments, at least some of the one or more organic solvents can have a boiling point of about 100° C. or greater. In some embodiments, at least some of the one or more organic solvents can have a boiling point of about 200° C. or greater. In some embodiments, the one or more organic solvents can have boiling points ranging between about 50° C. and about 200° C. Use of high boiling organic solvents can desirably increase the pot life of the nanoparticle paste formulations and limit the rapid loss of solvent, which can lead to cracking and void formation during nanoparticle consolidation. In some embodiments, at least some of the organic solvents can have a boiling point that is higher than those of the surfactants associated with the metal nanoparticles. Accordingly, surfactant can be removed from the metal nanoparticles by evaporation before removal of the organic solvent(s) takes place.

In some embodiments, the organic matrix can contain one or more alcohols. In various embodiments, the alcohols can include monohydric alcohols, diols, triols, glycol ethers (e.g., diethylene glycol and Methylene glycol), alkanolamines (e.g., ethanolamine, triethanolamine, and the like), or any combination thereof. In some embodiments, one or more hydrocarbons can be present in combination with one or more alcohols. As discussed above, it is believed that alcohol and hydrocarbon solvents can passively promote the solubilization of surfactants as they are removed from the metal nanoparticles by Brownian motion and limit their re-association with the metal nanoparticles. Moreover, hydrocarbon and alcohol solvents only weakly coordinate with metal nanoparticles, so they do not simply replace the displaced surfactants in the nanoparticle coordination sphere. Illustrative but non-limiting examples of alcohol and hydrocarbon solvents that can be present in the nanoparticle paste formulations include, for example, light aromatic petroleum distillate (CAS 64742-95-6), hydrotreated light petroleum distillates (CAS 64742-47-8), tripropyleneglycol methyl ether, ligroin (CAS 68551-17-7, a mixture of $C_{10}$-$C_{13}$ alkanes), diisopropyleneglycol monomethyl ether, diethyleneglycol diethyl ether, 2-propanol, 2-butanol, t-butanol, 1-hexanol, 2-(2-butoxyethoxy) ethanol, and terpineol. In some embodiments, polyketone solvents can be used in a like manner.

In some embodiments, the organic matrix can contain one or more amines and one or more organic acids. In some embodiments, the one or more amines and one or more organic acids can be present in an organic matrix that also includes one or more hydrocarbons and one or more alcohols. As discussed above, it is believed that amines and organic acids can actively sequester surfactants that have been passively solubilized by hydrocarbon and alcohol solvents, thereby making the surfactants are unavailable for re-association with the metal nanoparticles. Thus, an organic solvent that contains a combination of one or more hydrocarbons, one or more alcohols, one or more amines, and one or more organic acids can provide synergistic benefits for promoting the consolidation of metal nanoparticles. Illustrative but non-limiting examples of amine solvents that can be present in the nanoparticle paste formulations include, for example, tallowamine (CAS 61790-33-8), alkyl ($C_8$-$C_{18}$) unsaturated amines (CAS 68037-94-5), di(hydrogenated tallow)amine (CAS 61789-79-5), dialkyl ($C_8$-$C_{20}$) amines (CAS 68526-63-6), alkyl ($C_{10}$-$C_{16}$)dimethyl amine (CAS 67700-98-5), alkyl ($C_{14}$-$C_{18}$) dimethyl amine (CAS 68037-93-4), dihydrogenated tallowmethyl amine (CAS 61788-63-4), and trialkyl ($C_6$-$C_{12}$) amines (CAS 68038-01-7). Illustrative but non-limiting examples of organic acid solvents that can be present in the nanoparticle paste formulations include, for example, octanoic acid, nonanoic acid, decanoic acid, caprylic acid, pelargonic acid, undecylic acid, lauric acid, tridecylic acid, myristic acid, pentadecanoic acid, palmitic acid, margaric acid, stearic acid, nonadecylic acid, a-linolenic acid, stearidonic acid, oleic acid, and linoleic acid.

In some embodiments, nanoparticle paste formulations described herein can include an organic matrix containing one or more organic solvents and a plurality of metal nanoparticles dispersed in the organic matrix, where the nanoparticle paste formulation contains about 30% to about 90% metal nanoparticles by weight and the metal nanoparticles have a surfactant coating thereon that comprises one or more surfactants. The one or more organic solvents can include a hydrocarbon, an alcohol, an amine, and an organic acid.

In some embodiments, the organic matrix can include more than one hydrocarbon, more than one alcohol, more than one amine, and more than one organic acid. For example, in some embodiments, each class of organic solvent can have two or more members, or three or more members, or four or more members, or five or more members, or six or more members, or seven or more members, or eight or more members, or nine or more members, or ten or more members. Moreover, the number of members in each class of organic solvent can be the same or different. Particular benefits of using multiple members of each class of organic solvent are described hereinafter.

One particular advantage of using multiple members within each class of organic solvent can include the ability to provide a wide spread of boiling points in the nanoparticle paste formulations. By providing a wide spread of boiling points, the organic solvents can be removed gradually as the temperature is raised while affecting metal nanoparticle consolidation, thereby limiting volume contraction and disfavoring cracking. By gradually removing the organic solvent in this manner, less temperature control may be needed to affect slow solvent removal than if a single solvent with a narrow boiling point range was used. In some embodiments, the members within each class of organic solvent can have a window of boiling points ranging between about 50° C. and about 200° C., or between about 50° C. and about 250° C., or between about 100° C. and about 200° C., or between about 100° C. and about 250° C. In more particular embodiments, the various members of each class of organic solvent can each have boiling points that are separated from one another by at least about 20° C., specifically about 20° C. to about 50° C. More specifically, in some embodiments, each hydrocarbon can have a boiling point that differs by about 20° C. to about 50° C. from other hydrocarbons in the organic matrix, each alcohol can have a boiling point that differs by about 20° C. to about 50° C. from other alcohols in the organic matrix, each amine can have a boiling point that differs by about 20° C. to about 50° C. from other amines in the organic matrix, and each organic acid can have a boiling point that differs by about 20° C. to about 50° C. from other organic acids in the organic matrix. As one of ordinary skill in the art will recognize, the more members of each class of organic solvent that are present, the smaller the differences between boiling points can be made. By having smaller differences between boiling points, solvent removal can be made more continual, thereby limiting the degree of volume contraction that occurs at each stage. The inventors have found that a reduced degree of cracking occurs when four to five or more members of each class of organic solvent are present (e.g., four or more hydrocarbons, four or more alcohols, four or more amines, and four or more organic acids; or five or more hydrocarbons, five or more alcohols, five or more amines, and five or more organic acids), each having boiling points that are separated from one another within the above range. Moreover, by providing organic solvents with a range of boiling points, the risk of void formation during nanoparticle consolidation can also be lessened.

In some embodiments, the organic matrix of the nanoparticle paste formulations can be free of organic resins. The inventors have found that when resins are present, the nanoparticle paste formulations are much more prone to cracking during metal nanoparticle consolidation. The lack of organic resins further distinguishes the nanoparticle paste formulations described herein from conventional lead-free solder pastes, which are formulated in a resin matrix.

In addition to metal nanoparticles and organic solvents, other additives can also be present in the nanoparticle paste formulations. Such additional additives can include, for example, rheology control aids, thickening agents, micron-scale conductive additives, nanoscale conductive additives, and any combination thereof. Chemical additives can also be present. As discussed hereinafter, the inclusion of micron-scale conductive additives can be particularly advantageous.

In some embodiments, the micron-scale conductive additives can be micron-scale metal particles. In some embodiments, the nanoparticle paste formulations can contain about 0.01% to about 15% micron-scale metal particles by weight, or about 1% to about 10% micron-scale metal particles by weight, or about 1% to about 5% micron-scale metal particles by weight. Inclusion of micron-scale metal particles in the nanoparticle paste formulations can desirably reduce the incidence of cracking that occurs during consolidation of the metal nanoparticles. Without being bound by any theory or mechanism, it is believed that the micron-scale metal particles can become consolidated with one another as the metal nanoparticles are liquefied and flow between the micron-scale metal particles. In some embodiments, the micron-scale metal particles can range between about 500 nm to about 100 microns in size in at least one dimension, or from about 500 nm to about 10 microns in size in at least one dimension, or from about 100 nm to about 5 microns in size in at least one dimension, or from about 100 nm to about 10 microns in size in at least one dimension, or from about 100 nm to about 1 micron in size in at least one dimension, or from about 1 micron to about 10 microns in size in at least one dimension, or from about 5 microns to about 10 microns in size in at least one dimension, or from about 1 micron to about 100 microns in size in at least one dimension. The micron-size metal particles can contain the same metal as the metal nanoparticles or contain a different metal. Thus, metal alloys can be fabricated by including micron-size metal particles that differ from the metal nanoparticles in the nanoparticle paste formulations. Suitable micron-scale metal particles can include, for example, Cu, Ni, Al, Fe, Co, Mo, Ag, Zn, Sn, Au, Pd, Pt, Ru, Mn, Cr, Ti, V, Mg or Ca particles. Non-metal particles such as, for example, Si and B can be used in a like manner. In some embodiments, the micron-scale metal particles can be in the form of metal flakes, such as high aspect ratio copper flakes, for example. That is, in some embodiments, the nanoparticle paste formulations described herein can contain a mixture of copper nanoparticles and high aspect ratio copper flakes. Specifically, in some embodiments, the nanoparticle paste formulations can contain about 30% to about 90% copper nanoparticles by weight and about 0.01% to about 15% high aspect ratio copper flakes by weight. Other micron-scale metal particles that can be used equivalently to high aspect ratio metal flakes include, for example, metal nanowires and other high aspect ratio particles, which can be up to 300 microns in length.

In some embodiments, nanoscale conductive additives can also be present in the nanoparticle paste formulations. These additives can desirably provide further structural reinforcement and reduce shrinkage during metal nanoparticle consolidation. Moreover, inclusion of nanoscale conductive additives can increase electrical and thermal conductivity values that can approach or even exceed that of the corresponding bulk metal following nanoparticle consolidation. In some embodiments, the nanoscale conductive additives can have a size in at least one dimension ranging between about 1 micron and about 100 microns, or ranging between about 1 micron and about 300 microns. Suitable nanoscale conductive additives can include, for example, carbon nanotubes, graphene, and the like. When present, the nanoparticle paste formulations can contain about 1% to about 10% nanoscale conductive additives by weight, or about 1% to about 5% nanoscale conductive additives by weight. Additional substances that can also optionally be present include, for example, flame retardants, UV protective agents, antioxidants, carbon black, graphite, fiber materials (e.g., chopped carbon fiber materials), and the like.

As exemplified above, the nanoparticle paste formulations described herein can possess a high solids content. As used herein, the term "solids content" will refer to the total amount of solid material distributed in the organic matrix. Solid material in the organic matrix constituting the solids content of the nanoparticle paste formulations can include the metal nanoparticles and micron-scale metal particles, nanoscale conductive additives, and/or other solids, if present. As discussed above, by maintaining a high solids content, the present nanoparticle paste formulations can desirably display a reduced volume contraction and decreased propensity toward cracking during metal nanoparticle consolidation. In some embodiments, the nanoparticle paste formulations described herein can have a solids content ranging between about 30% to about 95% of the nanoparticle paste formulation by volume, or between about 50% to about 90% of the nanoparticle paste formulation by volume, or between about 70% to about 90% of the nanoparticle paste formulation by volume, or between about 75% to about 90% of the nanoparticle paste formulation by volume.

Figure 3:
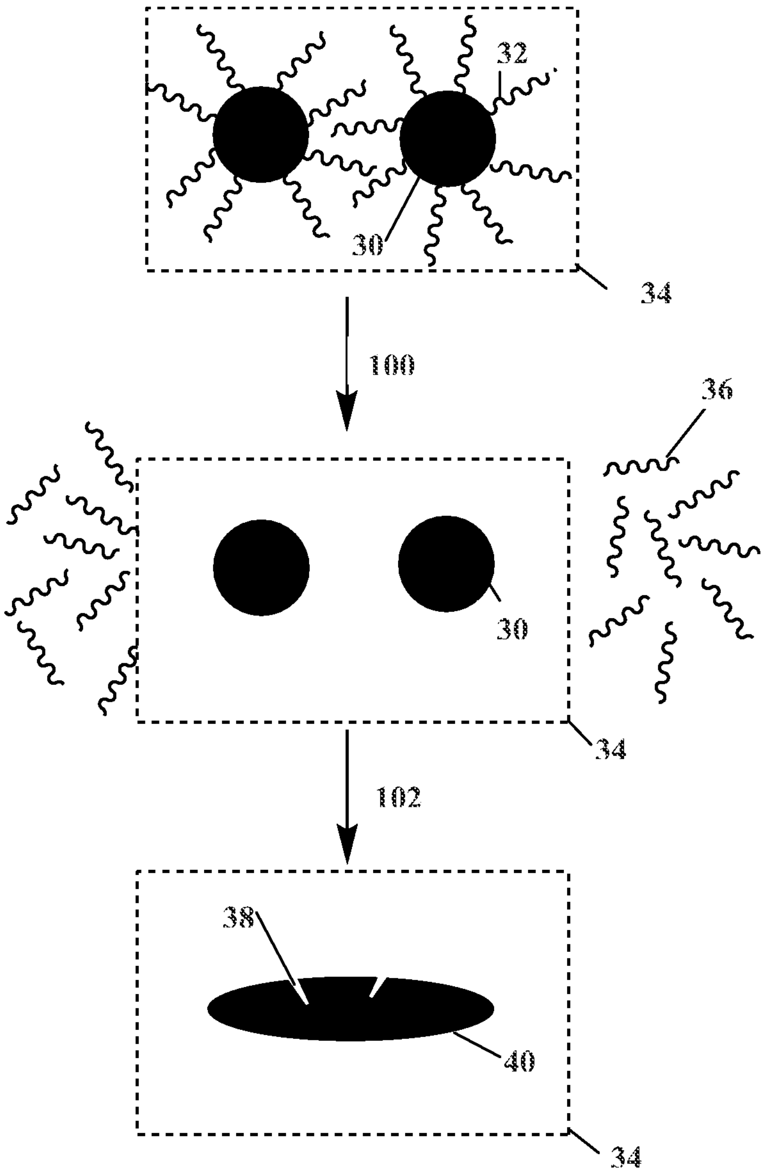
FIG. 3 shows an illustrative schematic demonstrating how cracks can form due to volume contraction during consolidation of as-produced metal nanoparticles.

Without being bound by any theory or mechanism, FIG. 3 shows an illustrative schematic demonstrating how cracks can form due to volume contraction during consolidation of as-produced metal nanoparticles. As shown in FIG. 3, metal nanoparticles 30 having surfactant coating 32 thereon are disposed in close proximity to one another. Upon heating metal nanoparticles 30 in operation 100, surfactant coating 32 is driven off from metal nanoparticles 30 and escapes near-region 34 surrounding metal nanoparticles 30 as free surfactants 36. Free surfactants 36 outside near-region 34 are no longer in position to become readily re-associated with metal nanoparticles 30. Loss of surfactant coating 32 as free surfactants 36 produces a rapid volume contraction in near-region 34. Accordingly, with continued heating in operation 102, consolidation of metal nanoparticles 30 at or above their fusion temperature produces cracks 38 in consolidated mass 40.

Figure 4:
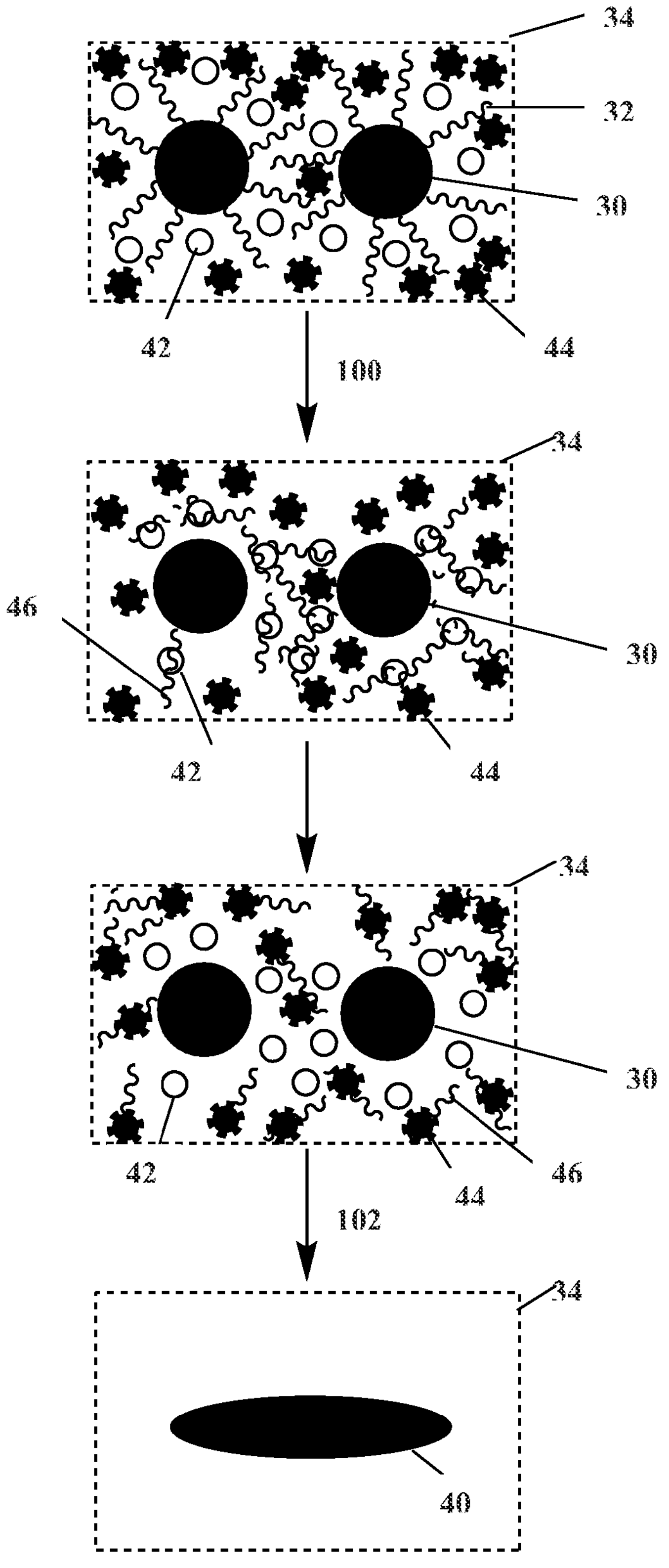
FIG. 4 shows an illustrative schematic demonstrating how the organic matrix of a nanoparticle paste formulation can promote nanoparticle consolidation without crack formation occurring.

As described above, incorporating metal nanoparticles in a nanoparticle paste formulation can reduce the severity of volume contraction that occurs during metal nanoparticle consolidation. Remaining unbound by any theory or mechanism, FIG. 4 shows an illustrative schematic demonstrating how the organic matrix of a nanoparticle paste formulation can promote nanoparticle consolidation without crack formation occurring. As shown in FIG. 4, metal nanoparticles 30 are again in close proximity to one another and have surfactant coating 32 thereon. Unlike the as-produced metal nanoparticles 30 in FIG. 3, near-region 34 in FIG. 4 contains various solvents of the organic matrix of the nanoparticle paste formulations. Specifically, passive solvent molecules 42 (i.e., hydrocarbon and alcohol solvent molecules) and active solvent molecules 44 (i.e., amine and organic acid solvent molecules) can surround metal nanoparticles 30 in near-region 34. Upon heating in operation 100, surfactant coating 32 can be released from metal nanoparticles 30, but the surfactants can become associated with passive solvent molecules 42 and/or active solvent molecules 44 to produce solubilized surfactants 46. Although FIG. 4 has depicted discrete interactions of solubilized surfactants 46 with passive solvent molecules 42 first, followed by active solvent molecules 44 thereafter, it is to be recognized that both processes can take place concurrently, and at any given time solubilized surfactants 46 can be associated with both passive solvent molecules 42 and active solvent molecules 44 within near-region 34. The net effect of this association is that there is a reduced propensity for rapid volume contraction within near-region 34, since the volume of near-region 34 remains filled. With continued heating in operation 102, metal nanoparticles 30 undergo consolidation at or above their fusion temperature to produce consolidated mass 40, where passive solvent molecules 42, active solvent molecules 44 and solubilized surfactants 46 are gradually removed from near-region 34 in the consolidation process with continued heating. As described hereinafter, various measures can also be undertaken while heating the nanoparticle paste formulations to further promote metal nanoparticle consolidation with minimal crack formation occurring. Although not depicted in the interest of clarity, micron-scale metal particles can accomplish a similar effect by reducing volume contraction in near-region 34 as other additives are removed through heating.

In some embodiments, methods for making nanoparticle paste formulations are described herein. In some embodiments, the methods can include providing a plurality of metal nanoparticles having a surfactant coating thereon, and combining the plurality of metal nanoparticles with an organic matrix to form the nanoparticle paste formulation, where the nanoparticle paste formulation contains about 30% to about 90% metal nanoparticles by weight. In some embodiments, the organic matrix can contain one or more organic solvents, which can include one or more of a hydrocarbon, an alcohol, an amine, and an organic acid. In some embodiments, the organic matrix can contain the combination of one or more hydrocarbons, one or more alcohols, one or more amines, and one or more organic acids, as described in more detail hereinabove.

In some embodiments, combining the plurality of metal nanoparticles with the organic matrix can include dispersing the plurality of metal nanoparticles in the organic matrix. While dispersing the plurality of metal nanoparticles in the organic matrix can take place by any suitable technique, the inventors have found that homogenization is a particularly desirable technique for preparing the nanoparticle paste formulations described herein. Homogenization can desirably reduce the maximum particle size within the nanoparticle paste formulations such that they maintain good fluidity and remain dispensable through micron-size apertures. Specifically, in some embodiments, homogenizing the plurality of metal nanoparticles in the organic matrix can break apart aggregates of metal nanoparticles such that the nanoparticle paste formulations have a maximum particle size of about 30 microns or less. In some embodiments, homogenization of the nanoparticle paste formulations can take place with mechanical mixing at a mixing speed of about 10,000 rpm or higher (e.g., about 10,000 rpm to about 30,000 rpm).

In some embodiments, methods for forming the nanoparticle paste formulations described herein can further include passing the nanoparticle paste formulations through a sizing mesh following dispersing the metal nanoparticles in the organic matrix. For example, in some embodiments, passing the nanoparticle paste formulations through a wire mesh can reduce the maximum particle size to less than about 30 microns. In some embodiments, the nanoparticle paste formulations can be passed through a 400, 500 or 600 mesh screen, or any combination thereof, to provide a maximum particle size of about 38, 25 or 15 microns, respectively. The maximum particle size may include agglomerates of metal nanoparticles with themselves and with other components of the nanoparticle paste formulations.

In some embodiments, the nanoparticle paste formulations described herein can be disposed on a substrate, and the metal nanoparticles can then be at least partially consolidated together by heating the metal nanoparticles at or above their fusion temperature to produce a consolidated mass. The nanoparticle paste formulations described herein can be used to form conductive lines, solders and like connections, thermal interfaces, and the like. The application in which the nanoparticle paste formulations are being employed can dictate the particular attributes needed for the nanoparticle paste formulations and the manner in which metal nanoparticle consolidation is carried out.

In some embodiments, methods for using the nanoparticle paste formulations described herein can include providing a nanoparticle paste formulation containing an organic matrix and a plurality of metal nanoparticles, where the nanoparticle paste formulation contains about 30% to about 90% metal nanoparticles by weight; dispensing the nanoparticle paste formulation onto a substrate; and at least partially consolidating the metal nanoparticles with one another by heating the dispensed nanoparticle paste formulation at or above a fusion temperature of the metal nanoparticles. In some embodiments, the organic matrix can contain one or more organic solvents, which can include one or more of a hydrocarbon, an alcohol, an amine, and an organic acid. In some embodiments, the organic matrix can contain the combination of one or more hydrocarbons, one or more alcohols, one or more amines, and one or more organic acids, as described in more detail hereinabove.

The thermal ramp taken to reach the fusion temperature of the metal nanoparticles can influence the degree of cracking observed during nanoparticle consolidation. For example, by slowly increasing the temperature up to the fusion temperature of the metal nanoparticles, removal of the organic matrix from the metal nanoparticles can be slowed, thereby reducing volume contraction and the observed degree of cracking. In the event that micron-scale metal particles are not included in the nanoparticle paste formulations, the temperature ramp used to reach the fusion temperature can be especially important.

In some embodiments, the nanoparticle paste formulations can be heated in a continuous gradient up to the fusion temperature of the metal nanoparticles. As used herein, the term "continuous gradient" will refer to a thermal ramp in which there is a continual increase in temperature up to the fusion temperature of the metal nanoparticles. The heating rate can be the same at all points in a continuous gradient, or it can differ. For example, at lower temperatures, more rapid heating can occur, and as the temperature nears the boiling point of one or more of the organic solvents, the heating rate can then be slowed to decrease the rate of volume contraction.

In other embodiments, the nanoparticle paste formulations can be heated in a discontinuous gradient up to the fusion temperature of the metal nanoparticles. As used herein the term "discontinuous gradient" will refer to a thermal ramp in which there are one or more temperature plateaus as the temperature is increased up to the fusion temperature of the metal nanoparticles. As used herein, the term "temperature plateau" will refer to the condition of holding a temperature at a set level with a variance of not more than about ±5° C. for a period of time. That is, in a discontinuous gradient, the temperature can be held constant one or more times. As with a continuous gradient, the heating rate can be the same or different at points where the temperature is being increased. By holding the temperature constant at one or more temperature plateaus below the fusion temperature, better densification and a decreased degree of cracking during metal nanoparticle consolidation can be realized by reducing the rate of solvent removal.

As a non-limiting example, the following discontinuous gradient can be used to produce a connection having good mechanical strength from a copper nanoparticle paste formulation described herein. The discontinuous gradient can begin with an initial drying operation at room temperature for about 1 hour, followed by a ramp to about 50° C. and heating at that temperature for about 20 minutes. Thereafter, the temperature can again be ramped to about 90° C. and heating continued at that temperature for about 20 minutes. Subsequently, the temperature can again be ramped to about 200° C. where copper nanoparticle consolidation can take place.

Heating of the nanoparticle paste formulations can take place through any technique known to one of ordinary skill in the art including, for example, ovens (e.g., vapor phase reflow ovens), lasers, lamps, heated gas flows and the like. In some embodiments, heating and metal nanoparticle consolidation can be carried out under vacuum or in an inert gas such as, for example, dry nitrogen, argon or forming gas (5% $H_2$/95% Ar).

In embodiments where micron-scale metal particles are omitted from the nanoparticle paste formulations, implementation of a discontinuous gradient may be especially desirable to mitigate crack formation during metal nanoparticle consolidation. In embodiments where micron-scale metal particles have been omitted from the nanoparticle paste formulations, extended heating at the first temperature plateau, at a minimum, may be especially useful to promote metal nanoparticle consolidation with minimal or no crack formation occurring. For example, when micron-scale metal particles are omitted from the nanoparticle paste formulations, the first temperature plateau may be maintained for a much longer period of time (e.g., a period of about 3-6 hours), thereby promoting very slow removal of the organic solvent(s) in the organic matrix. Slow organic solvent removal can also be aided by continuous gas flow across the nanoparticle paste formulations as they are being dried.

In some embodiments, methods described herein can further include heating the dispensed nanoparticle paste formulation at least at a first temperature plateau, where the first temperature plateau has a temperature below the fusion temperature of the metal nanoparticles. In some embodiments, the temperature can be held constant at the first temperature plateau for a period of time ranging between about 5 minutes and about 24 hours, or between about 10 minutes and about 10 hours, or between about 20 minutes and about 6 hours, or between about 5 minutes and about 60 minutes, or between about 10 minutes and about 30 minutes, or between about 30 minutes and about 6 hours, or between about 1 hour and about 3 hours, or between about 2 hours and about 4 hours.

In some embodiments, the methods described herein can farther include heating the dispensed nanoparticle paste formulation at a second temperature plateau, where the second temperature plateau has a temperature that is higher than that of the first temperature plateau and below the fusion temperature of the metal nanoparticles. In some embodiments, the temperature can be held constant at the second temperature plateau for a period of time ranging between about 5 minutes and about 24 hours, or between about 10 minutes and about 10 hours, or between about 20 minutes and about 6 hours, or between about 5 minutes and about 60 minutes, or between about 10 minutes and about 30 minutes, or between about 30 minutes and about 6 hours, or between about 1 hour and about 3 hours, or between about 2 hours and about 4 hours.

Although the invention has been described with reference to the disclosed embodiments, those skilled in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A nanoparticle paste formulation comprising:

an organic matrix comprising one or more organic solvents, the one or more organic solvents comprising a hydrocarbon, an alcohol, an amine, and an organic acid; and a plurality of metal nanoparticles dispersed in the organic matrix, the plurality of metal nanoparticles comprising about 70% to about 90% of the nanoparticle paste formulation by weight;

wherein the nanoparticle paste formulation maintains a fluid state and is dispensable through a micron-size aperture.

2. The nanoparticle paste formulation of claim 1, wherein the metal nanoparticles have a surfactant coating thereon, the surfactant coating comprising one or more surfactants.

3. The nanoparticle paste formulation of claim 1, wherein the organic matrix comprises more than one hydrocarbon, more than one alcohol, more than one amine, and more than one organic acid.

4. The nanoparticle paste formulation of claim 3, wherein each hydrocarbon has a boiling point that differs by about 20° C. to about 50° C. from other hydrocarbons in the organic matrix, each alcohol has a boiling point that differs by about 20° C. to about 50° C. from other alcohols in the organic matrix, each amine has a boiling point that differs by about 20° C. to about 50° C. from other amines in the organic matrix, and each organic acid has a boiling point that differs by about 20° C. to about 50° C. from other organic acids in the organic matrix.

5. The nanoparticle paste formulation of claim 4, wherein the organic matrix comprises four or more hydrocarbons, four or more alcohols, four or more amines, and four or more one organic acids.

6. The nanoparticle paste formulation of claim 1, further comprising:

micron-scale metal particles comprising about 0.01% to about 15% of the nanoparticle paste formulation by weight.

7. The nanoparticle paste formulation of claim 1, further comprising:

one or more additives selected from the group consisting of a rheology control aid, a thickening agent, a micron-scale conductive additive, a nanoscale conductive additive, and any combination thereof.

8. The nanoparticle paste formulation of claim 1, wherein the nanoparticle paste formulation has a maximum particle size of about 30 microns or less.

9. A nanoparticle paste formulation comprising:

an organic matrix comprising one or more organic solvents, the one or more organic solvents comprising a hydrocarbon, an alcohol, an amine, and an organic acid; and a plurality of metal nanoparticles dispersed in the organic matrix, the plurality of metal nanoparticles comprising about 70% to about 90% of the nanoparticle paste formulation by weight;

wherein the metal nanoparticles have a surfactant coating thereon, the surfactant coating comprising one or more surfactants.

10. The nanoparticle paste formulation of claim 9, wherein the organic matrix comprises more than one hydrocarbon, more than one alcohol, more than one amine, and more than one organic acid.

11. The nanoparticle paste formulation of claim 10, wherein each hydrocarbon has a boiling point that differs by about 20° C. to about 50° C. from other hydrocarbons in the organic matrix, each alcohol has a boiling point that differs by about 20° C. to about 50° C. from other alcohols in the organic matrix, each amine has a boiling point that differs by about 20° C. to about 50° C. from other amines in the organic matrix, and each organic acid has a boiling point that differs by about 20° C. to about 50° C. from other organic acids in the organic matrix.

12. The nanoparticle paste formulation of claim 11, wherein the organic matrix comprises four or more hydrocarbons, four or more alcohols, four or more amines, and four or more one organic acids.

13. The nanoparticle paste formulation of claim 9, further comprising:

micron-scale metal particles comprising about 0.01% to about 15% of the nanoparticle paste formulation by weight.

14. The nanoparticle paste formulation of claim 9, further comprising:

one or more additives selected from the group consisting of a rheology control aid, a thickening agent, a micron-scale conductive additive, a nanoscale conductive additive, and any combination thereof.

15. A method comprising:

providing a plurality of metal nanoparticles having a surfactant coating thereon; and combining the plurality of metal nanoparticles with an organic matrix to form a nanoparticle paste formulation;

wherein the plurality of metal nanoparticles comprise about 70% to about 90% of the nanoparticle paste formulation by weight; and wherein the organic matrix comprises one or more organic solvents, the one or more organic solvents comprising a hydrocarbon, an alcohol, an amine, and an organic acid.

16. The method of claim 15, wherein combining the plurality of metal nanoparticles with an organic matrix comprises dispersing the plurality of metal nanoparticles in the organic matrix.

17. The method of claim 16, wherein dispersing the plurality of metal nanoparticles in the organic matrix comprises homogenizing the plurality of metal nanoparticles in the organic matrix such that the nanoparticle paste formulation has a maximum particle size of about 30 microns or less.

18. A method comprising:

providing a nanoparticle paste formulation comprising an organic matrix and a plurality of metal nanoparticles dispersed in the organic matrix, the plurality of metal nanoparticles comprising about 70% to about 90% of the nanoparticle paste formulation by weight and the organic matrix comprising one or more organic solvents;

wherein the one or more organic solvents comprise a hydrocarbon, an alcohol, an amine, and an organic acid;

dispensing the nanoparticle paste formulation onto a substrate; and at least partially consolidating the metal nanoparticles with one another by heating the dispensed nanoparticle paste formulation at a temperature at or above a fusion temperature of the metal nanoparticles.

19. The method of claim 18, further comprising:

heating the dispensed nanoparticle paste formulation at least at a first temperature plateau, the first temperature plateau having a temperature below the fusion temperature of the metal nanoparticles.

20. The method of claim 19, further comprising:

heating the dispensed nanoparticle paste formulation at a second temperature plateau, the second temperature plateau having a temperature that is higher than that of the first temperature plateau and below the fusion temperature of the metal nanoparticles.

21. The method of claim 19, wherein the organic matrix comprises more than one hydrocarbon, more than one alcohol, more than one amine, and more than one organic acid;

wherein each hydrocarbon has a boiling point that differs by about 20° C. to about 50° C. from other hydrocarbons in the organic matrix, each alcohol has a boiling point that differs by about 20° C. to about 50° C. from other alcohols in the organic matrix, each amine has a boiling point that differs by about 20° C. to about 50° C. from other amines in the organic matrix, and each organic acid has a boiling point that differs by about 20° C. to about 50° C. from other organic acids in the organic matrix.

22. The method of claim 21, wherein the organic matrix comprises four or more hydrocarbons, four or more alcohols, four or more amines, and four or more one organic acids.

* * * * *